(12) United States Patent
Brocklehurst et al.

(10) Patent No.: US 8,056,851 B2
(45) Date of Patent: Nov. 15, 2011

(54) HELICOPTER ANTITORQUE TAIL ROTOR (75) Inventors: Alan Brocklehurst, Dorset (GB);
Alessandro Scandroglio, Oleggio (IT)

(73) Assignee: Agusta S.p.A., Samarate (IT)

( * ) Notice: Subject to any disclaimer, the term of this patent is extended or adjusted under 35 U.S.C. 154(b) by 364 days.

(21) Appl. No.: 12/469,246

(22) Filed: May 20, 2009

(65) Prior Publication Data

US 2010/0092294 A1 Apr. 15, 2010

(30) Foreign Application Priority Data

May 22, 2008 (EP) .................................. 08425368

(51) Int. Cl.
*B64C 27/00* (2006.01)
*B64C 27/82* (2006.01)

(52) U.S. Cl. ............... 244/17.21; 244/17.11; 244/17.13; 416/134 A; 416/138

(58) Field of Classification Search ............... 416/134 A, 416/134 R, 138, 140, 141, 147, 238, 243, 416/294; 244/17.21, 17.11, 17.13, 17.19, 244/6

See application file for complete search history.

(56) References Cited

U.S. PATENT DOCUMENTS

| | | | | |
|---|---|---|---|---|
| 4,028,003 A | * | 6/1977 | Krauss | 416/141 |
| 4,332,525 A | * | 6/1982 | Cheney, Jr. | 416/134 A |
| 4,626,172 A | * | 12/1986 | Mouille et al. | 416/134 A |
| 4,809,930 A | * | 3/1989 | Ballerio et al. | 244/17.11 |
| 4,844,698 A | | 7/1989 | Gornstein et al. | |
| 4,927,331 A | | 5/1990 | Vuillet et al. | |
| 5,167,384 A | * | 12/1992 | Krepak | 244/17.21 |
| 5,249,925 A | | 10/1993 | Guimbal et al. | |
| 5,263,821 A | * | 11/1993 | Noehren et al. | 416/97 R |
| 5,566,907 A | * | 10/1996 | Marze et al. | 244/17.19 |
| 5,607,122 A | * | 3/1997 | Hicks et al. | 244/17.19 |
| 5,690,474 A | | 11/1997 | Byrnes et al. | |
| 6,764,280 B2 | * | 7/2004 | Sehgal et al. | 416/104 |
| 6,929,215 B2 | * | 8/2005 | Arlton | 244/17.11 |
| 6,974,105 B2 | * | 12/2005 | Pham | 244/6 |
| 7,926,759 B2 | * | 4/2011 | Muylaert et al. | 244/17.21 |
| 2009/0214342 A1 | * | 8/2009 | Brindejonc | 416/115 |

* cited by examiner

*Primary Examiner* — Chris Chu (74) *Attorney, Agent, or Firm* — Fish & Richardson P.C.

(57) ABSTRACT

A blade for an antitorque tail rotor of a helicopter, having a leading edge and a trailing edge opposite each other and elongated along a longitudinal axis of the blade; the trailing edge, in use, interacts with the air current after the leading edge; the blade also has two opposite surfaces extending between the leading edge and the trailing edge, and a root portion extending from a radially inner first end, with respect to a rotation axis of the blade, towards a second end opposite the first end; and the root portion, when sectioned in a plane perpendicular to the leading edge and trailing edge, has a profile asymmetrical with respect to a chord joining the leading edge and trailing edge.

15 Claims, 7 Drawing Sheets

HELICOPTER ANTITORQUE TAIL ROTOR

CROSS REFERENCE TO RELATED APPLICATIONS

This application claims priority under 35 U.S.C. §119 to European Patent Application No. 08425368.1 filed May 22, 2008. The entirety of the application is incorporated herein by reference.

BACKGROUND OF THE INVENTION

Helicopters are known comprising a fuselage; a main rotor fitted to the top of a centre portion of the fuselage; and an antitorque tail rotor for opposing the torque generated by the main rotor on the fuselage.

Tail rotors substantially comprise a drive shaft; a hub fitted to the drive shaft; and a number of blades fixed to and projecting radially from the hub.

More specifically, each blade extends lengthwise substantially radially, and is rotated by the hub in a plane perpendicular to the drive shaft axis.

Each blade is also movable in any plane with respect to the hub to manoeuvre the helicopter.

A need is felt within the industry to improve the aerodynamic efficiency of the blades, and reduce the loads on the blades and the tail rotor control mechanisms, without increasing the radial size of the tail rotor.

SUMMARY OF THE INVENTION

It is an object of the present invention to provide a helicopter antitorque tail rotor designed to achieve the above in a straightforward, low-cost manner.

According to the present invention, there is provided a helicopter antitorque tail rotor, as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 9:
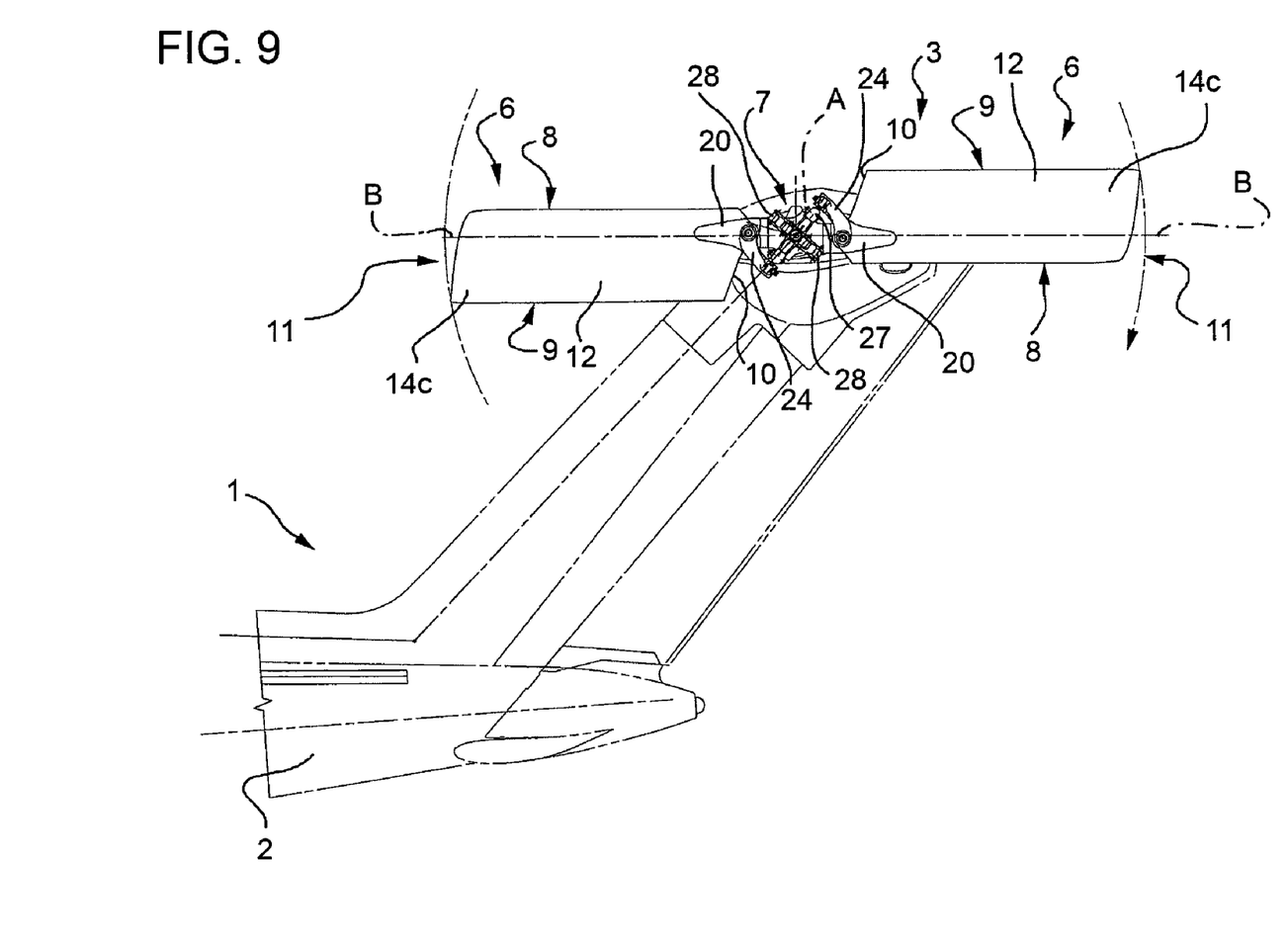
FIG. 9 shows a side view, with parts removed for clarity, of a tail portion of a helicopter comprising an antitorque rotor featuring a number of blades as illustrated in FIGS. 1-4.
Figure 12:
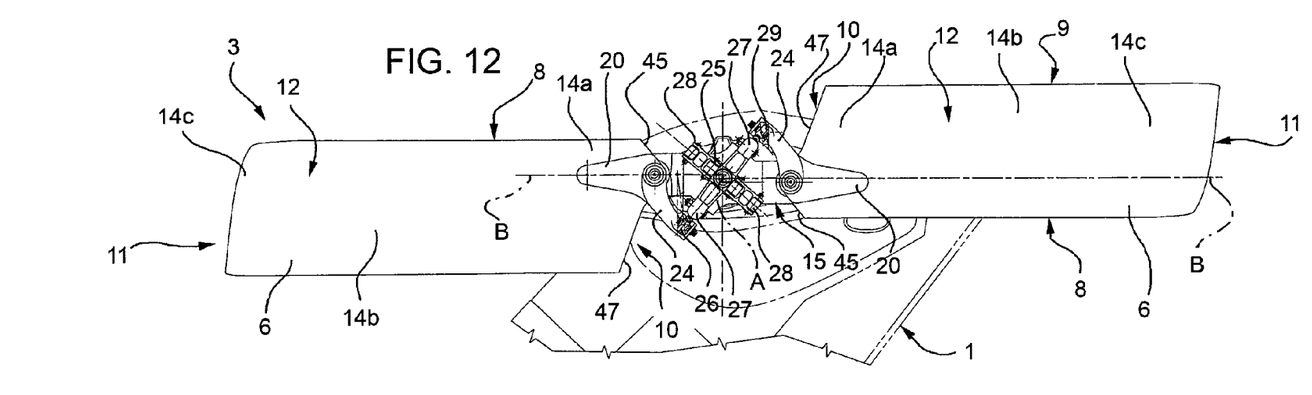
FIGS. 12 and 13 show side and top plan views respectively of the FIG. 9-11 tail rotor.
Figure 13:
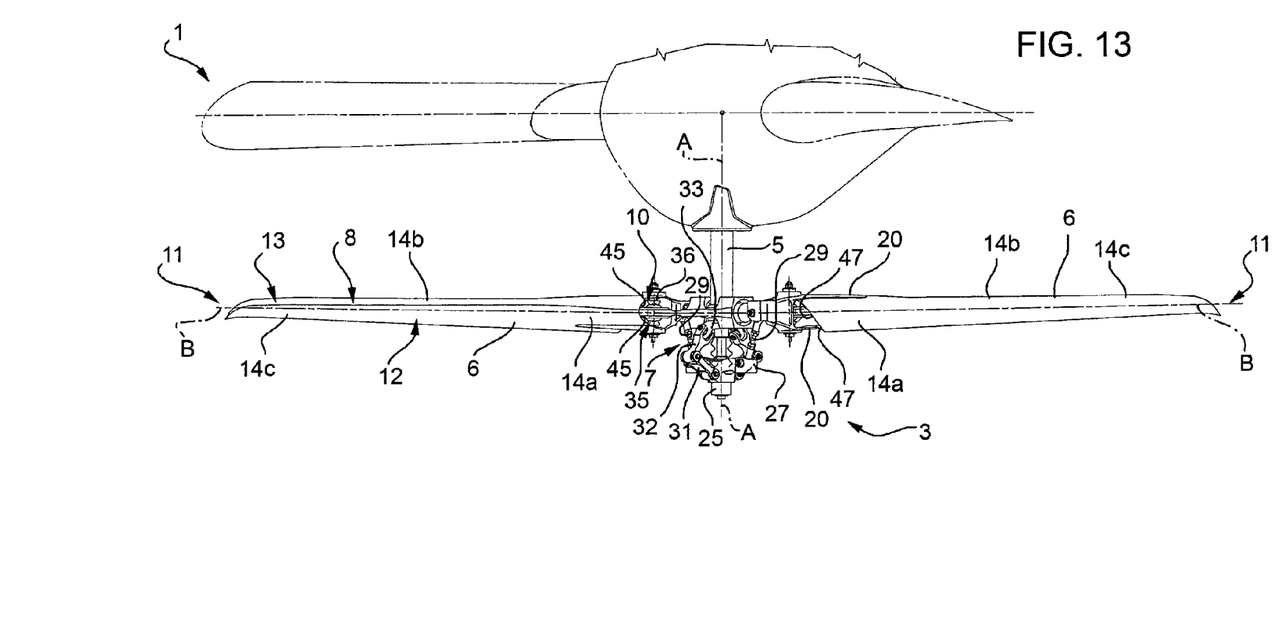

FIGS. 9, 12 and 13 show a tail portion of a helicopter 1 substantially comprising a fuselage 2; a main rotor (not shown) fitted to the top of fuselage 2 and rotating about a respective axis; and a tail rotor 3 projecting from a tail fin of fuselage 2 to oppose the torque transmitted by rotor 3 to fuselage 2.

More specifically, rotor 3 substantially comprises (FIGS. 9 to 13):
- a drive shaft 5 rotating about an axis A crosswise to the rotation axis of the main rotor;
- a number of—in the example shown, two—blades 6 extending along respective axes B substantially radial with respect to axis A; and
- a hub 7 connected functionally to shaft 5, and from which blades 6 project.

More specifically, hub 7 rotates blades 6 about axis A, allows blades 6 to move freely with respect to shaft 5 in a plane defined by axis A and respective axes B, and allows rotation of blades 6, by an external control, about respective axes B to adjust the respective angles of attack with respect to the air current.

Axis A is located outside blades 6.

With particular reference to FIGS. 1 to 4, each blade 6 is hollow and bounded by:
- a leading edge 8 defined by the foremost points of blade 6 with reference to the rotation direction (shown in FIG. 9) of blade 6;
- a trailing edge 9 defined by the rearmost points of blade 6 with respect to said rotation direction, and located on the opposite side to leading edge 8;
- a radially inner end 10 located on the hub 7 side and interposed between leading edge 8 and trailing edge 9; and
- a radially outer end 11 opposite end 10 and also interposed between leading edge 8 and trailing edge 9.

Each blade 6 substantially comprises a face 12 and a back 13, which are interposed radially between ends 10 and 11 and separated by leading edge 8 and trailing edge 9.

More specifically, back 13 is interposed between face 12 and the tail fin from which rotor 3 projects.

From end 10 to end 11, blade 6 comprises (FIGS. 1-4 and 8):
- a root portion 14a;
- an intermediate portion 14b; and
- an end portion 14c curving away from the tail fin of helicopter 1 with respect to root portion 14a and intermediate portion 14b.

In other words, end portion 14c has an anhedral with respect to the rest of blade 6.

From end 10 to end 11, leading edge 8 (FIG. 4) comprises a straight first portion extending along root portion 14a; a straight second portion sloping with respect to the first portion; and a curved portion extending along end portion 14c.

Figure 4:
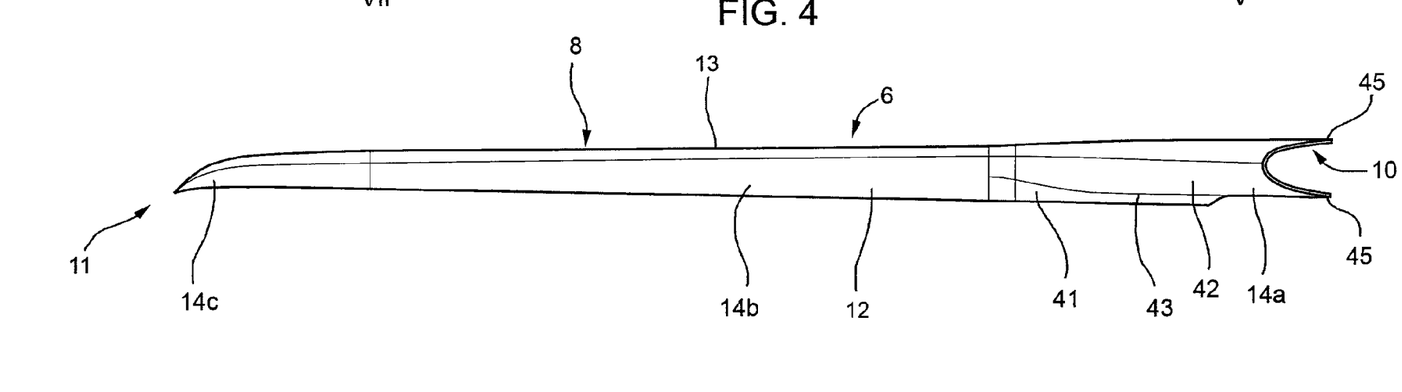
FIG. 4 shows a front view of a leading edge of the FIG. 1 blade.

More specifically, the second portion extends along intermediate portion 14b.

Hub 7 comprises (FIGS. 9 to 13):
- a plate 15, which is rotated by shaft 5 about axis A, rotates with respect to shaft 5 about an axis C perpendicular to axis A and axes B, and is connected to blades 6 in angularly fixed manner with respect to axis A, and in rotary manner with respect to relative axes B;
- two pairs of plates 20 connected in fixed manner to relative blades 6; and
- a sleeve 25 (FIGS. 10 and 11) which is rotated by shaft 5 about axis A, is slid along axis A with respect to shaft 5 by a control not shown, and is connected to the two pairs of plates 20 to rotate blades 6 about respective axes B.

Figure 10:
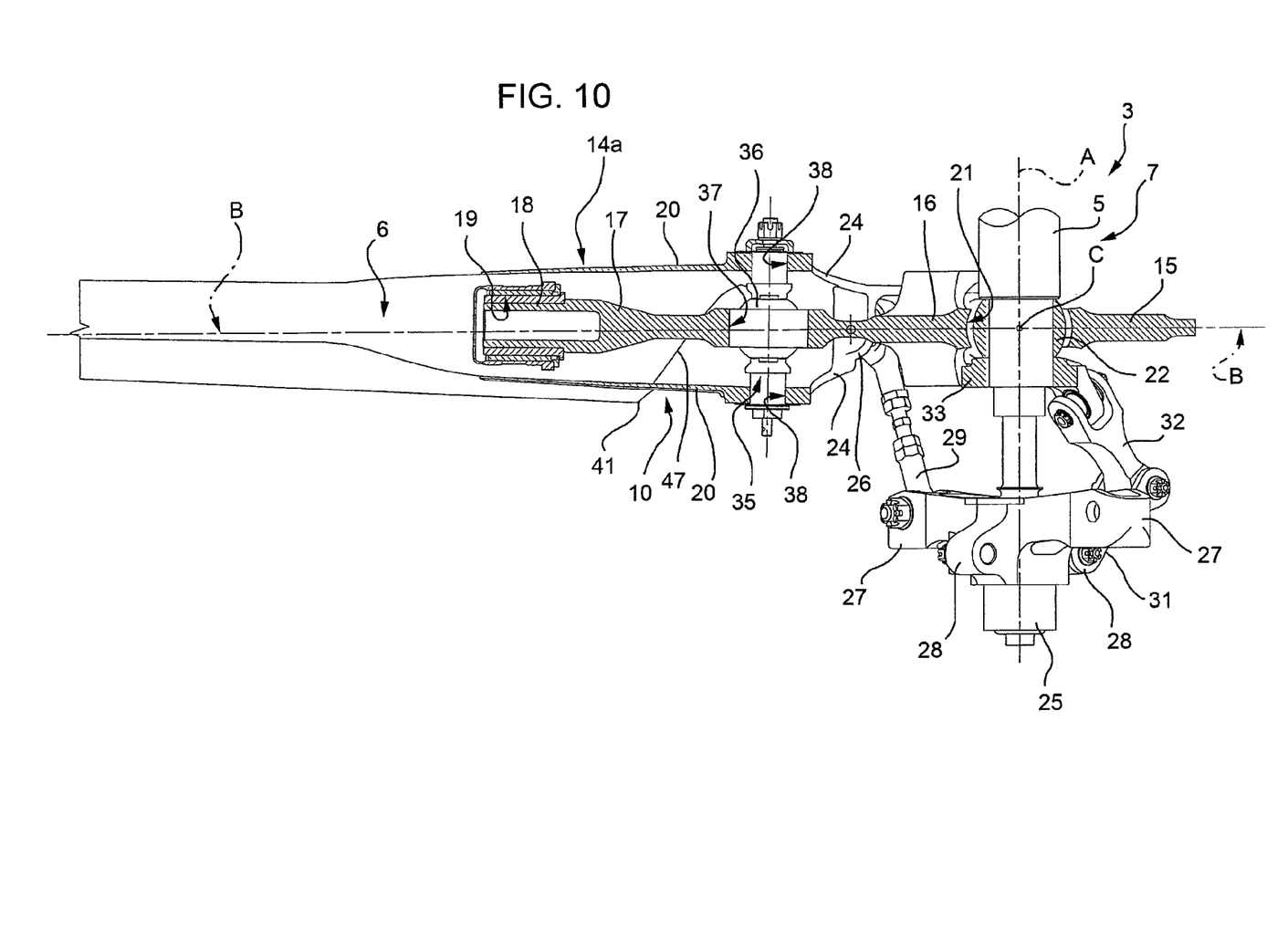
FIGS. 10 and 11 show sections, with parts removed for clarity, of the FIG. 9 tail rotor.

More specifically, plate 15 lies in a plane crosswise to axis A, and comprises a main portion 16 fitted to shaft 5; and two appendixes 17 having respective ends 18 opposite axis A and fitted inside respective seats 19 of respective blades 6 (FIG. 10).

Shaft 5 (FIGS. 10 and 11) is surrounded by a cylindrical member 22 engaging a seat 21 defined by main portion 16. Member 22 and seat 21 are connected in rotary manner about axis C and in angularly fixed manner about axis A. The surfaces of member 22 and seat 21 are conjugate, and have respective coincident centres located at the intersection of axes A and C.

Figure 11:
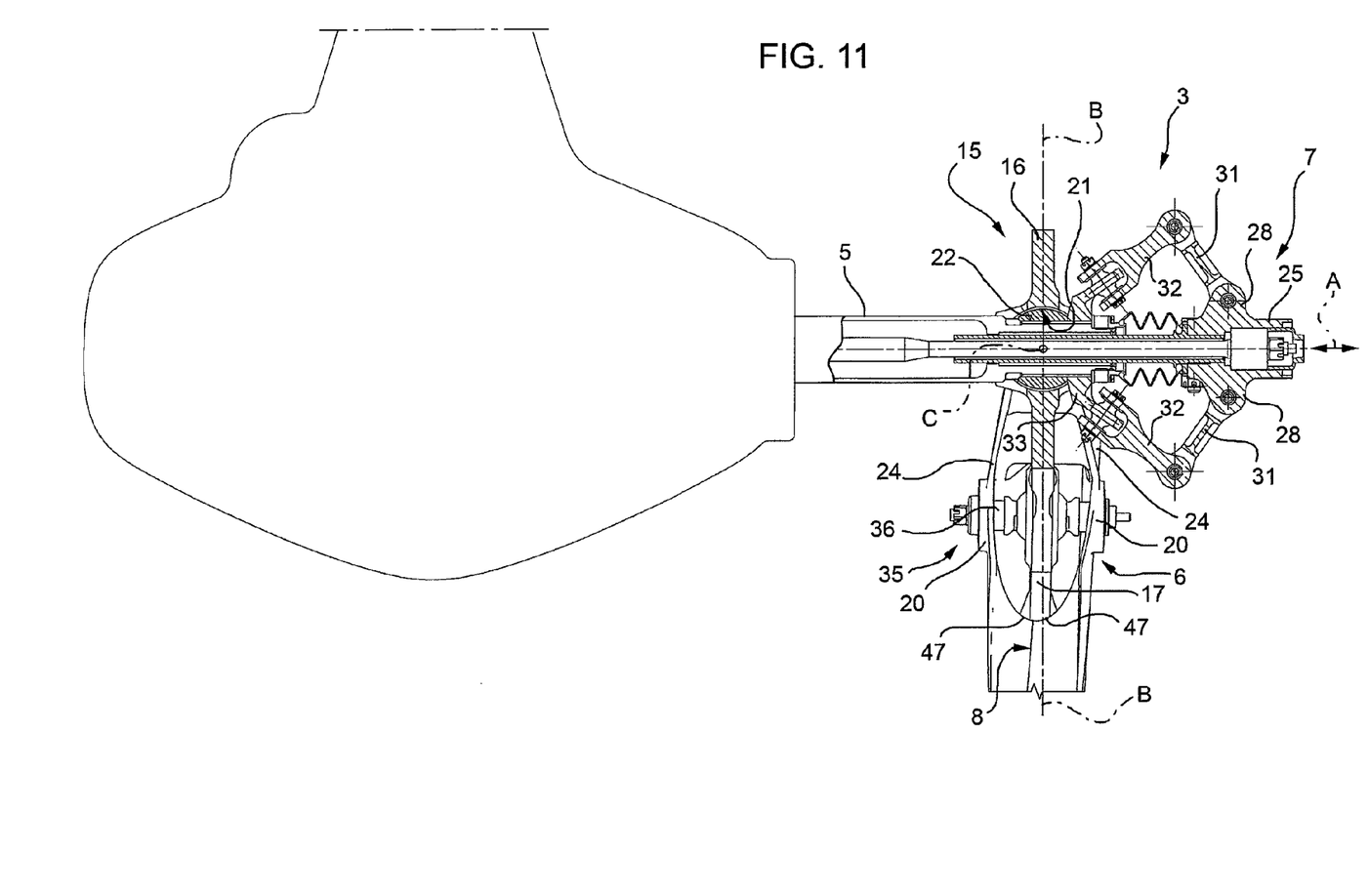

Seat 21 and member 22 thus define a cylindrical hinge, of axis C, allowing blades 6 to oscillate integrally with each other, i.e. flap, about axis C and with respect to shaft 5. More specifically, such oscillation is caused by the different aerodynamic loads on blades 6, as a result of the different relative speeds of blades 6 with respect to the air current.

Appendixes 17 project from main portion 16 on opposite sides of axis A, and extend inside respective blades 6; ends 18 are in the form of hollow cylinders coaxial with respective axes B; and seats 19 are in the form of cylindrical cavities extending along respective axes B, so that insertion of ends 18 inside respective seats 19 allows blades 6 to rotate about respective axes B with respect to plate 15, and makes blades 6 and plate 15 angularly fixed about axes A and C.

Plates 20 in each pair are fixed one to the face 12 and the other to the back 13 of a relative blade 6, are parallel to each other, and lie in respective substantially parallel planes.

Hub 7 comprises, for each pair of plates 20, a pair of arms 24 (FIGS. 9, 10, 11) having first ends fixed to respective plates 20 in the same pair of plates 20. The second ends of arms 24 in each pair are connected to each other by a transverse member 26 interposed between axis A and end 10 of relative blade 6.

Sleeve 25 projects from shaft 5 on the opposite side of the tail fin, and comprises:
  first radial appendixes 27 (FIGS. 10, 12, 13) diametrically opposite with respect to axis A and connected to respective members 26 by respective ties 29; and
  second radial appendixes 28 diametrically opposite with respect to axis A, and each connected by two levers 31, 32 to a plate 33 angularly integral with shaft 5 and interposed, along axis A, between shaft 5 and sleeve 25.

More specifically, each appendix 27 is interposed angularly between appendixes 28.

Ties 29 extend crosswise to axis A, and have first ends connected to relative appendixes 27; and second ends, opposite the first ends, connected to respective members 26 eccentrically with respect to relative axes B (FIG. 10).

More specifically, ties 29 are connected to respective members 26 so that, when sleeve 25 slides along axis A, blades 6 rotate in the same direction about respective axes B.

Each lever 31 has a first end hinged to sleeve 25; and a second end, opposite the first end, hinged to a first end of a corresponding lever 32.

Each lever 32 has a second end, opposite the first end, hinged to plate 33.

Plates 20 in each pair are connected to each other by a pin 35 perpendicular to axis B of relative blade 6, and which has an intermediate portion 36 housed inside root portion 14a of relative blade 6, and engaging a seat 37, defined by relative appendix 17, in rotary manner with respect to axis B.

More specifically, intermediate portion 36 has a spherical outer surface mating with a spherical surface defined by seat 37. More specifically, the spherical surfaces defined by intermediate portion 36 and relative seat 37 are concentric, and have respective centres along relative axis B.

Intermediate portions 36 of pins 35 and relative seats 37 thus define respective hinges allowing blades 6 to rotate about respective axes B with respect to plate 15.

Face 12 and back 13 of each blade 6 have respective holes 38 (FIGS. 1 to 3) adjacent to end 10 and fitted through with opposite ends of relative pin 35.

When sectioned in a plane perpendicular to leading edge 8 and trailing edge 9 (FIG. 5), root portion 14a advantageously has a profile G asymmetrical with respect to a chord P joining leading edge 8 and trailing edge 9.

Figure 5:
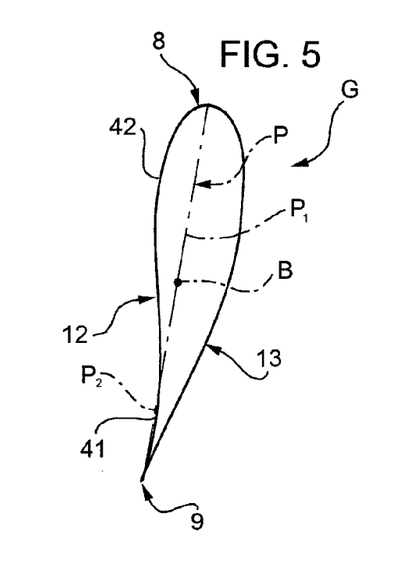
FIGS. 5 to 8 show sections in respective planes V-V, VI-VI, VII-VII, VIII-VIII in FIG. 3.

By virtue of the asymmetrical design of profile G, root portion 14a plays an active part in the lift generated on blades 6 and, therefore, in the torque transmitted by rotor 3 to fuselage 2.

More specifically, face 12 and back 13 are blended at leading edge 8, and are joined by a sharp edge at trailing edge 9, along both root portion 14a and intermediate and end portions 14b, 14c.

At root portion 14a, back 13 is convex, whereas face 12 has a concave first portion 41 adjacent to trailing edge 9, and a convex second portion 42 interposed between portion 41 and leading edge 8 (FIG. 5).

Figure 1:
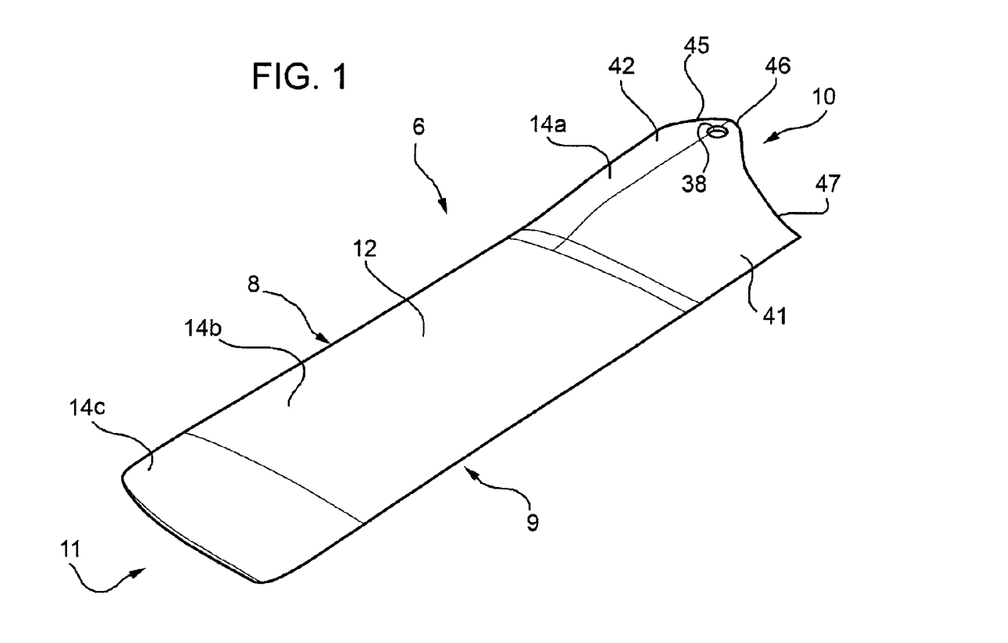
FIGS. 1 and 2 show views in perspective, from different angles, of a helicopter antitorque tail rotor blade in accordance with the present invention.
Figure 2:
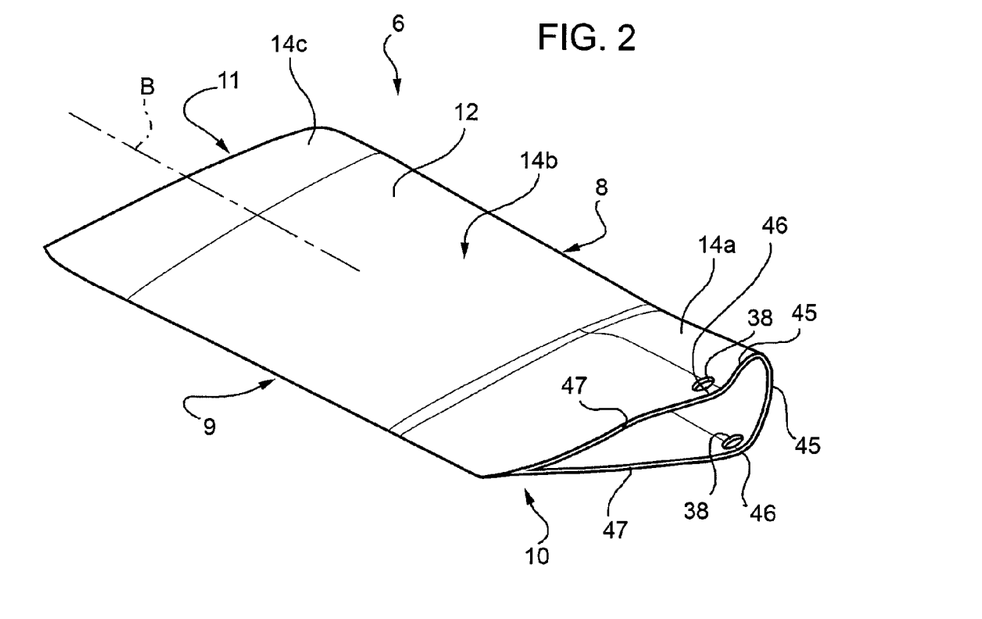
Figure 3:
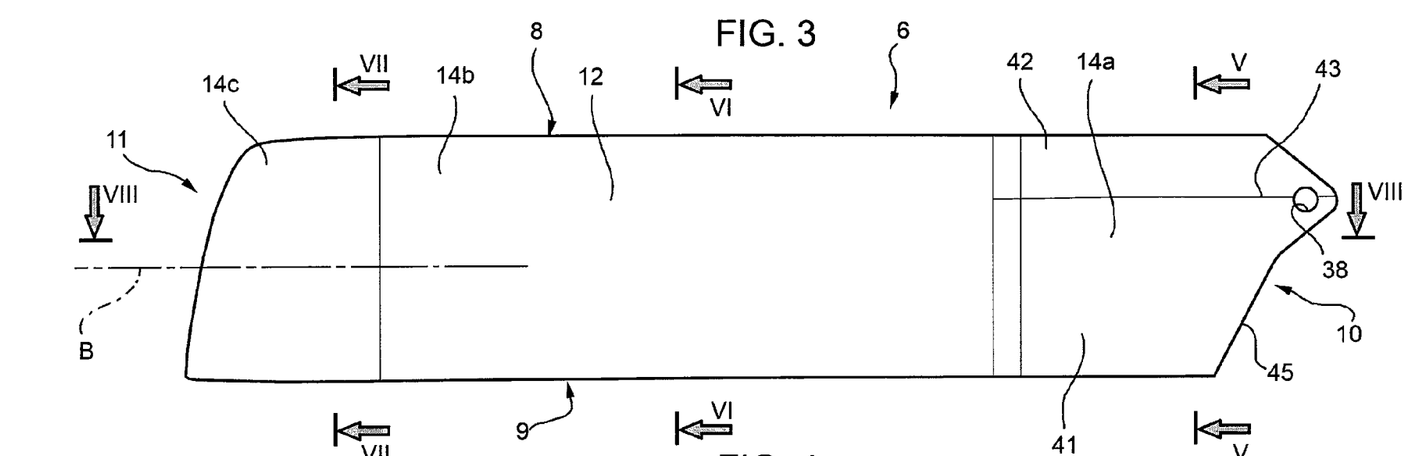
FIG. 3 shows a plan view of the FIGS. 1 and 2 blade.

In each section perpendicular to leading edge 8 and trailing edge 9, the points of profile G defining back 13 are further away from chord P than the corresponding points of profile G defining face 12 (FIGS. 3, 4, 5).

With reference to profile G, chord P comprises a main portion $P_1$ interposed between face 12 and back 13; and an end portion $P_2$ at the trailing edge 9 end. More specifically, adjacent to trailing edge 9, portion 41 is interposed between end portion $P_2$ and back 13 (FIG. 5).

More specifically, profile G is obtained at a section of root portion 14a adjacent to end 10.

The points at which face 12 is furthest from back 13 at root portion 14a are indicated by portion 43 in FIGS. 1 to 4.

Figure 6:
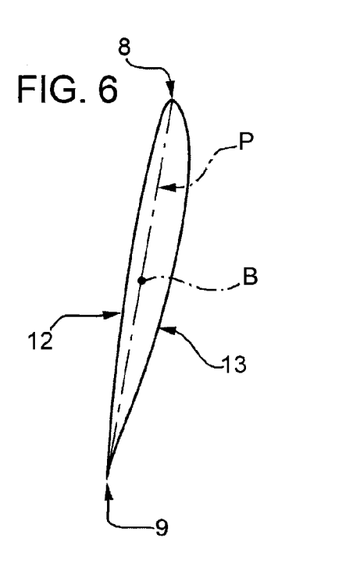
Figure 7:
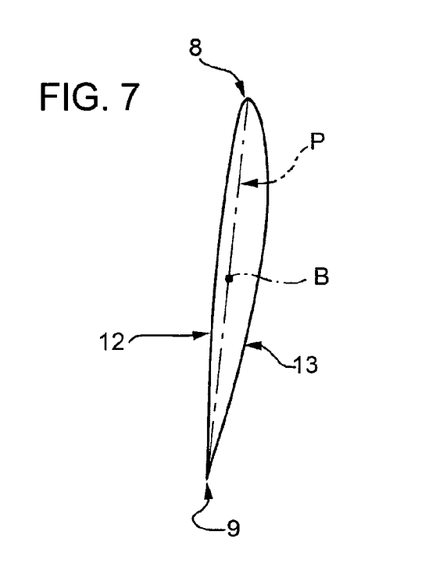

In the FIGS. 6 and 7 sections of intermediate portion 14b and end portion 14c in respective planes perpendicular to trailing edge 9, back 13 and face 12 are both convex (FIGS. 6 and 7).

In the FIGS. 6 and 7 sections of blade 6, chord P is interposed between back 13 and face 12.

From leading edge 8 to trailing edge 9 in each section of blade 6 in a plane perpendicular to trailing edge 9, face 12 and back 13 first diverge and then converge (FIGS. 5 to 7).

Figure 8:
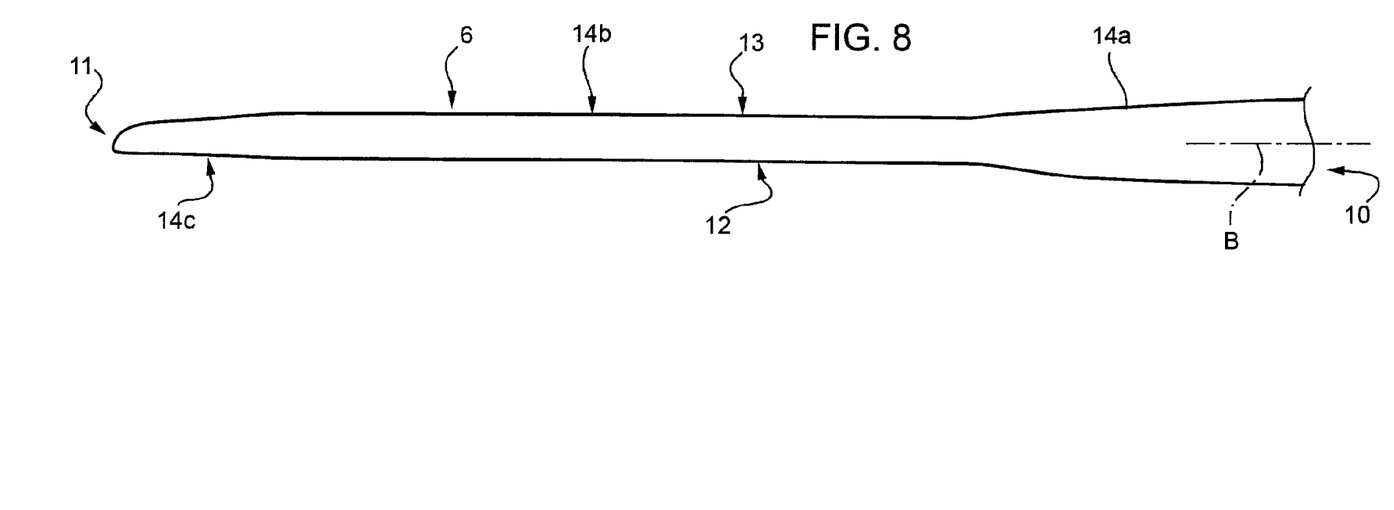

As shown in FIG. 8, in an intermediate longitudinal plane of blade 6 between leading edge 8 and trailing edge 9, face 12 and back 13 converge at root portion 14a, remain a constant distance apart at intermediate portion 14b, and converge at end portion 14c.

The length of chord P of blade 6, i.e. the distance between leading edge 8 and trailing edge 9, measured perpendicularly to trailing edge 9, is constant at intermediate portion 14b.

As shown in FIGS. 5 to 7, the slope of chords P with respect to a fixed axis perpendicular to leading edge 8 and trailing edge 9 varies from end 10 to end 11. More specifically, the fixed axis is vertical with reference to FIGS. 5 to 7, and the angle between chords P and the fixed axis decreases from root portion 14a (FIG. 5) to end portion 14c (FIG. 7).

In other words, the setting angle of blades 6 varies along respective axes B, i.e. as opposed to lying in one plane, the locus of the points of chords P has a curved profile when viewed from above.

At end 10, face 12 and back 13 comprise, from leading edge 8 to trailing edge 9, respective first portions 45 lying in the same plane sloping with respect to trailing edge 9; respective curved second portions 46 surrounding respective holes 38; and respective third portions 47 lying in the same plane sloping with respect to the plane of portions 45.

Portions 45 extend symmetrically with respect to relative axis B (FIGS. 4 and 13, left), whereas portions 47 are asymmetrical with respect to relative axis B.

The distance between end 10 and axis A advantageously ranges between 10 and 25% of the maximum distance between the points of end 11 and axis A.

The distance between end 10 and axis A preferably ranges between 10 and 23% of the maximum distance between the points of end 11 and axis A.

In actual use, shaft 5 rotates about axis A to rotate hub 7.

Plate 15 rotates blades 6 about axis A, while the connection between member 22 and seat 21 in plate 15 allows blades 6 to oscillate freely about axis C under aerodynamic loads.

By means of an external control, blades 6 can be rotated by the same angle and in the same direction about respective axes B to vary the angles of attack of blades 6 with respect to the air current flowing over blades 6.

More specifically, the external control translates sleeve 25 along axis A, which translation is transmitted to ties 29 and members 26.

Ties 29 being connected to members 26 eccentrically with respect to relative axes B, translation of ties 29 rotates plates 20 and, therefore, blades 6 about respective axes B.

As the blades rotate, seats 19 of blades 6 rotate about respective axes B with respect to the corresponding ends 18 of relative appendixes 17 of plate 15, and pins 35 rotate about relative axes B with respect to seats 37 of relative appendixes 17.

During normal operation of rotor 3, significant lift is generated on root portions 14a of blades 6.

Root portions 14a of blades 6 therefore play an active part in the force transmitted by rotor 3 to the tail fin, and, therefore, the torque transmitted to fuselage 2.

The advantages of rotor 3 according to the present invention will be clear from the above description.

In particular, by virtue of its design, root portion 14a of blade 6 plays an active part in the aerodynamic force exchanged between the air current and blade 6, and therefore the torque transmitted by rotor 3 to fuselage 2 of helicopter 1.

More specifically, the Applicant has observed that the design of root portion 14a provides for generating lift even at distances from axis A ranging between 10 and 20% of the overall radial size of blade 6. In other words, for a given Reynolds number, the design of root portion 14a improves the lift coefficient of blade 6.

Blade 6 therefore provides for maximum aerodynamic efficiency of rotor 3 for a given overall radial size of rotor 3.

Moreover, because lift is also generated at sections of blade 6 extremely close to axis A, stress caused by bending moments on the control members of rotor 3 is greatly reduced for a given righting torque generated by rotor 3.

In other words, for a given righting torque generated by rotor 3, and therefore a given resultant of the lift forces on blades 6, the design of root portions 14a brings the point of application of the resultant closer to axis A.

Clearly, changes may be made to rotor 3 as described and illustrated herein without, however, departing from the protective scope defined in the accompanying Claims.

In particular, the means hinging hub 7 to shaft 5 and blades 6 to hub 7 may be of a different type.

The invention claimed is:

1. A helicopter antitorque tail rotor (3), comprising a shaft (5) rotating about a rotation axis (A), at least two blades (6) extending along relative longitudinal axes (B) crosswise to said rotation axis (A), and a hub (7) for connecting said shaft (5) to said blades (6);

each blade (6) comprising, in turn,:

a leading edge (8) and a trailing edge (9) opposite each other and elongated along relative longitudinal axis (B); said trailing edge (9), in use, interacting with the air current after said leading edge (8);

a first and a second surface (12, 13) opposite each other and extending between said leading edge (8) and said trailing edge (9);

a radially inner first end (10) with respect to a rotation axis (A) of said blade (6);

a radially outer second end (11) opposite to said radially inner first end (10); and a root portion (14a) comprising said radially inner first end (10) and spaced from said outer second end (11) along said longitudinal direction (B);

said root portion (14a), when sectioned in a plane perpendicular to said leading edge (8) or said trailing edge (9), comprising a profile (G) asymmetrical with respect to a chord (P) joining said leading edge and said trailing edge (8, 9) in said plane;

characterized in that the points of first ends (10) of said blades (6) are located at a distance from said rotation axis (A) ranging between 10 and 25% of the maximum distance between said rotation axis (A) and the points of said second ends (11) of said blades (6).

2. A rotor as claimed in claim 1, characterized in that said hub (7) defines control means (25, 20, 35, 36) for rotating said blades (6) about respective said longitudinal axes (B) to vary the angles of attack of said blades (6) with respect to the air current; said control means (25, 20, 35, 36) being at least partly (36) housed in respective said root portions (14a) of said blades (6).

3. A rotor as claimed in claim 2, characterized in that said control means (25, 20, 35, 36) comprise at least:

an actuator (25) movable parallel to said rotation axis (A);

at least two pairs of plates (20) integral with respective blades (6) and connected functionally to said actuator (25) to rotate about the respective longitudinal axes (B); and two pins (35) which rotate about respective said longitudinal axes (B), are integral with respective pairs of plates (20), and each have a respective portion (36) extending inside a respective said root portion (14a).

4. A rotor as claimed in claim 1, characterized in that, at said root portion (14a), said first and second surface (12, 13) of each blade (6) are blended at said leading edge (8).

5. A rotor as claimed in claim 1, characterized in that, at said root portion (14a), said first and second surface (12, 13) of each blade (6) are sharply joined at said trailing edge (9).

6. A rotor as claimed in claim 1, characterized in that said second surface (13) of each blade (6) is convex at said root portion (14a).

7. A rotor as claimed in claim 1, characterized in that said first surface (12) of each blade (6) is partly concave and partly convex at said root portion (14a).

8. A rotor as claimed in claim 7, characterized in that, from said trailing edge (9) to said leading edge (8), said first surface (12) of each blade (6) comprises, at said root portion (14a), a concave portion (41) followed by a convex portion (42).

9. A rotor as claimed in claim 1, characterized in that said chord (P) of each blade (6) comprises a main portion ($P_1$) interposed between said first and second surface (12, 13); and in that one (12) of said first and second surface (12, 13) is interposed between an end portion ($P_2$) of said chord (P) and the other (13) of said first and second surface (12, 13).

10. A rotor as claimed in claim 9, characterized in that said end portion ($P_2$) of said chord (P) of each blade (6) is located on said trailing edge (9) side.

11. A rotor as claimed in claim 9, characterized in that an end portion of said first surface (12) of each blade (6), located on said trailing edge (9) side, is interposed between said end portion ($P_2$) of said chord (P) and said second surface (13).

12. A rotor as claimed in claim 1, characterized in that the points of said profile (G) defining said first surface (12) of each blade (6) are further away from said chord (P) than the corresponding points defining said second surface (13).

13. A rotor as claimed in claim 1, characterized in that each said blade (6) comprises:
- an end portion (14c) comprising, in turn, said radially outer second end (11); and
- an intermediate portion (14b) interposed, along said longitudinal axis (B), between said root portion (14a) and said end portion (14c);
- said intermediate portion (14b) of each blade (6) being spaced from said first and second end (10, 11); the distance between said leading edge (8) and said trailing edge (9) at said intermediate portion (14b) being constant, and the length of said chord (P) at said intermediate portion (14b) being constant.

14. A rotor as claimed in claim 1, characterized in that, from said leading edge (8) to said trailing edge (9) at said first end (10), said first and second surface (12, 13) of each blade (6) comprise:
- respective first portions (45) lying in the same plane sloping with respect to said trailing edge (9);
- respective curved second portions (46); and
- respective third portions (47) lying in the same plane sloping with respect to the plane of said first portions (45).

15. A helicopter comprising a tail rotor (3) as claimed in claim 1 and a tail fin; characterized in that that said second surface (13) is interposed between said tail fin and said first surface (12).

* * * * *